United States Patent
Calinov et al.

(10) Patent No.: US 7,356,711 B1
(45) Date of Patent: Apr. 8, 2008

(54) SECURE REGISTRATION

(75) Inventors: Iulian D. Calinov, Redmond, WA (US); Christopher N. Peterson, North Bend, WA (US); Wei-Quiang Michael Guo, Bellevue, WA (US); Danpo Zhang, Issaquah, WA (US); Gilbert M. McQuillan, Seattle, WA (US); Wei Jiang, Kirkland, WA (US); Sanjeev M. Nagvekar, Redmond, WA (US); Jeff Steinbok, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 862 days.

(21) Appl. No.: 10/158,376

(22) Filed: May 30, 2002

(51) Int. Cl.
*G06F 7/04* (2006.01)
*G06F 7/58* (2006.01)
*H04L 9/32* (2006.01)

(52) U.S. Cl. .............. 713/201; 726/2; 726/4; 726/17; 726/27

(58) Field of Classification Search ............ 726/2, 726/4–6, 17–19, 27
See application file for complete search history.

(56) References Cited

U.S. PATENT DOCUMENTS

| | | | |
|---|---|---|---|
| 5,535,279 A | 7/1996 | Seestrom | |
| 5,560,008 A | 9/1996 | Johnson et al. | |
| 5,682,478 A * | 10/1997 | Watson et al. | 709/229 |
| 5,684,951 A | 11/1997 | Goldman et al. | |
| 5,812,776 A | 9/1998 | Gifford | |
| 5,812,784 A * | 9/1998 | Watson et al. | 709/227 |
| 5,875,296 A | 2/1999 | Shi et al. | |
| 5,898,780 A * | 4/1999 | Liu et al. | 713/155 |
| 5,908,469 A | 6/1999 | Botz et al. | |
| 5,918,228 A | 6/1999 | Rich et al. | |
| 5,944,824 A | 8/1999 | He | |

(Continued)

FOREIGN PATENT DOCUMENTS

EP 0969366 A1 1/2000

(Continued)

OTHER PUBLICATIONS

Steiner et al., "Kerberos: An Authentication Service for Open Network Systems," USENIX Winter Conference, 1988, pp. 191-202.

(Continued)

*Primary Examiner*—Nasser Moazzami
*Assistant Examiner*—Chinwendu C Okoronkwo
(74) *Attorney, Agent, or Firm*—Senniger Powers

(57) ABSTRACT

Secure site-to-site transactional communication between at least two network servers coupled to a data communication network, including secure registration by an authentication server associated with a multi-site user authentication system. A network server receives a request via a browser f of a client computer. In response, the network server initiates a transaction with the authentication server and defines a data structure, such as a query string, associated with the transaction. The network server also generates a digital signature of the data structure and then adds it to the data structure before directing the client computer from the network server to the authentication server with the data structure and the added digital signature. The network server also adds an index to the data structure. The index is associated with the transaction and unique, per transaction, to the network server initiating the transaction.

41 Claims, 5 Drawing Sheets

U.S. PATENT DOCUMENTS

| | | | |
|---|---|---|---|
| 5,959,985 A | 9/1999 | Freen et al. | |
| 5,987,232 A | 11/1999 | Tabuki | |
| 6,006,266 A | 12/1999 | Murphy, Jr. et al. | |
| 6,006,332 A | 12/1999 | Rabne et al. | |
| 6,055,236 A | 4/2000 | Nessett et al. | |
| 6,088,451 A | 7/2000 | He et al. | |
| 6,088,805 A | 7/2000 | Davis et al. | |
| 6,092,196 A | 7/2000 | Reiche | |
| 6,134,592 A | 10/2000 | Montulli | |
| 6,144,990 A | 11/2000 | Brandt et al. | |
| 6,148,404 A | 11/2000 | Yatsukawa | |
| 6,163,841 A | 12/2000 | Venkatesan et al. | |
| 6,170,017 B1 | 1/2001 | Dias et al. | |
| 6,182,227 B1 | 1/2001 | Blair et al. | |
| 6,209,038 B1 | 3/2001 | Bowen et al. | |
| 6,223,289 B1 | 4/2001 | Wall et al. | |
| 6,226,752 B1* | 5/2001 | Gupta et al. | 726/9 |
| 6,230,269 B1 | 5/2001 | Spies et al. | |
| 6,246,771 B1 | 6/2001 | Stanton et al. | |
| 6,253,325 B1 | 6/2001 | Steele et al. | |
| 6,263,432 B1 | 7/2001 | Sasmazel et al. | |
| 6,311,275 B1 | 10/2001 | Jin et al. | |
| 6,314,425 B1 | 11/2001 | Serbinis et al. | |
| 6,321,262 B1 | 11/2001 | Springer | |
| 6,351,772 B1 | 2/2002 | Murphy, Jr. et al. | |
| 6,363,365 B1 | 3/2002 | Kou | |
| 6,367,012 B1 | 4/2002 | Atkinson et al. | |
| 6,374,359 B1 | 4/2002 | Shrader et al. | |
| 6,381,579 B1 | 4/2002 | Gervais et al. | |
| 6,421,781 B1 | 7/2002 | Fox et al. | |
| 6,438,600 B1 | 8/2002 | Greenfield et al. | |
| 6,463,474 B1 | 10/2002 | Fuh et al. | |
| 6,484,174 B1 | 11/2002 | Wall et al. | |
| 6,564,255 B1 | 5/2003 | Mobini et al. | |
| 6,578,199 B1 | 6/2003 | Tsou et al. | |
| 6,598,167 B2 | 7/2003 | Devine et al. | |
| 6,678,828 B1 | 1/2004 | Pham et al. | |
| 6,725,376 B1 | 4/2004 | Sasmazel et al. | |
| 6,763,468 B2* | 7/2004 | Gupta et al. | 726/2 |
| 6,766,454 B1* | 7/2004 | Riggins | 713/185 |
| 6,851,060 B1 | 2/2005 | Shrader | |
| 6,954,799 B2 | 10/2005 | Lerner | |
| 7,100,049 B2 | 8/2006 | Gasparini et al. | |
| 7,228,419 B2 | 6/2007 | Iino | |
| 2001/0034841 A1 | 10/2001 | Shambroom | |
| 2001/0037462 A1 | 11/2001 | Bengston | |
| 2001/0045451 A1* | 11/2001 | Tan et al. | 235/375 |
| 2001/0054155 A1 | 12/2001 | Hagan et al. | |
| 2002/0029350 A1 | 3/2002 | Cooper et al. | |
| 2002/0035681 A1* | 3/2002 | Maturana et al. | 713/151 |
| 2002/0059425 A1 | 5/2002 | Belfiore et al. | |
| 2002/0073320 A1 | 6/2002 | Rinkevich et al. | |
| 2002/0099809 A1 | 7/2002 | Lee | |
| 2002/0112155 A1 | 8/2002 | Martherus et al. | |
| 2002/0112183 A1 | 8/2002 | Baird, III et al. | |
| 2002/0120864 A1 | 8/2002 | Wu et al. | |
| 2002/0133723 A1 | 9/2002 | Tait | |
| 2002/0147929 A1* | 10/2002 | Rose | 713/201 |
| 2002/0150253 A1 | 10/2002 | Brezak et al. | |
| 2002/0152380 A1 | 10/2002 | O'Shea et al. | |
| 2002/0152393 A1 | 10/2002 | Thoma et al. | |
| 2002/0194501 A1* | 12/2002 | Wenocur et al. | 713/201 |
| 2003/0084179 A1 | 5/2003 | Kime et al. | |
| 2003/0093667 A1 | 5/2003 | Dutta et al. | |
| 2003/0093694 A1 | 5/2003 | Medvinsky et al. | |
| 2003/0149880 A1 | 8/2003 | Shamsaasef et al. | |
| 2003/0163691 A1 | 8/2003 | Johnson | |
| 2003/0217148 A1* | 11/2003 | Mullen et al. | 709/225 |
| 2004/0003084 A1 | 1/2004 | Malik et al. | |
| 2004/0019808 A1 | 1/2004 | Devine et al. | |
| 2004/0068665 A1 | 4/2004 | Fox et al. | |
| 2004/0210756 A1* | 10/2004 | Mowers et al. | 713/168 |
| 2005/0027849 A1* | 2/2005 | Cianciarulo et al. | 709/223 |
| 2005/0074126 A1 | 4/2005 | Stanko | |
| 2005/0114712 A1 | 5/2005 | Devine et al. | |
| 2005/0149759 A1 | 7/2005 | Vishwanath et al. | |
| 2005/0198531 A1* | 9/2005 | Kaniz et al. | 713/201 |
| 2005/0215771 A1 | 9/2005 | Malcolm | |
| 2005/0216671 A1* | 9/2005 | Rothman et al. | 711/137 |
| 2005/0216771 A1* | 9/2005 | Malcolm | 713/201 |

FOREIGN PATENT DOCUMENTS

| | | |
|---|---|---|
| WO | WO 01/77775 A2 | 10/2001 |
| WO | WO 02/33884 A2 | 4/2002 |
| WO | WO 0233884 A | 4/2002 |

OTHER PUBLICATIONS

Sirer et al., "An Access Control Language for Web Services," Seventh ACM Symposium on Access Control Models and Technologies, 2002, pp. 23-30, ACM Press, New York, NY, U.S.A.

Mazieres et al., "Escaping the Evils of Centralized Control with Self-Certifying Pathnames," Proceedings of the 8th ACM SIGOPS European Workshop on Support for Composing Distributed Applications, 1998, pp. 118-125, ACM Press, New York, NY, U.S.A.

Park et al., "Role-Based Access Control on the Web," ACM Transactions on Information and System Security, vol. 4, Issue 1 (Feb. 2001), pp. 37-71, ACM Press, New York, NY, U.S.A.

Joshi, "Security Models for Web-Based Applications," Communications of the ACM, vol., 44, Issue 2 (Feb. 2001), pp. 38-44, ACM Press, New York, NY, U.S.A.

Lampson, "Authentication in Distributed Systems: Theory and Practice," ACM Transactions on Computer Systems, vol. 10, Issue 4 (Nov. 1992), pp. 265-310, ACM Press, New York, NY, U.S.A.

Mazieres, "Separating Key Management from File System Security," Proceedings of the 17th ACM Symposium on Operating Systems Principles, 1999, pp. 124-139, ACM Press, New York, NY, U.S.A.

Lerner, "Protecting Your Site with Access Controls," Linux Journal, vol. 1998, Issue 49es (May 1998), pp. 1-9, Specialized Systems Consultants, Inc., Seattle, WA, U.S.A.

Samar, "Single Sign-On Using Cookies for Web Applications," Enabling Technologies: Infrastructure for Collaborative Enterprises Proceedings, IEEE 8th International Workshops, Aug. 16, 1999, pp. 158-163.

* cited by examiner

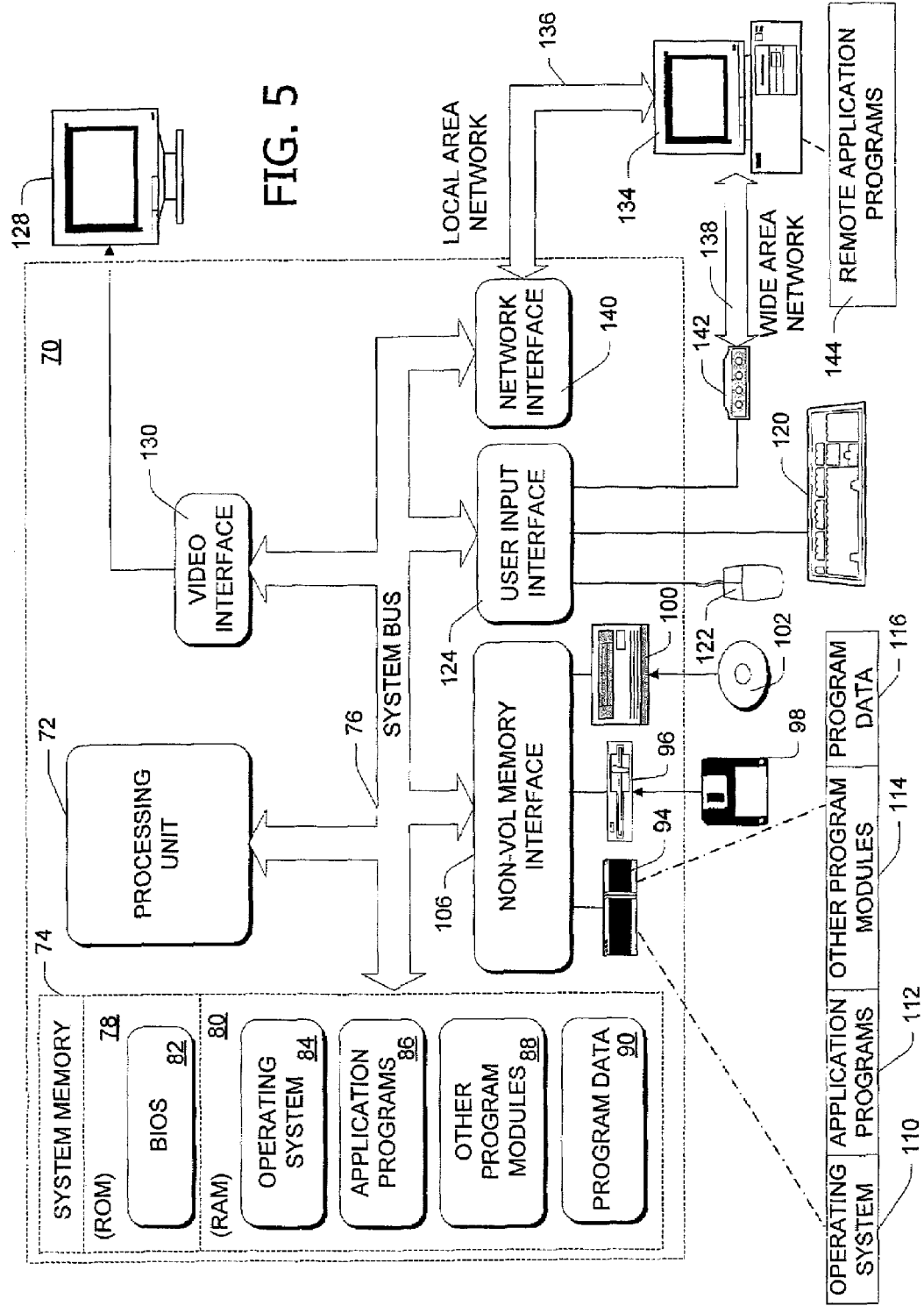

SECURE REGISTRATION

TECHNICAL FIELD

The present invention relates to the field of computer network environments. In particular, this invention relates to improved security in site-to-site transactional communications for preventing tampering by a third party.

BACKGROUND OF THE INVENTION

Web sites, or Internet sites, very often provide information, products, services, or the like to their users. Many web sites require users to "register" before their web servers will grant access to the users. During registration, a user typically supplies personal information such as username, account number, address, telephone number, e-mail address, computer platform, age, gender, and/or hobbies to the registering web site. The registration information may be necessary to complete transactions (e.g., commercial or financial transactions). Typically, the information also permits the web site to contact the user directly (e.g., via e-mail) to announce, for example, special promotions, new products, or new web site features. Additionally, web sites often collect user information so web site operators can better target future marketing activities or adjust the content provided by the sites.

When registering a user for the first time, a web site typically requests that the user select a login ID and an associated password. The login ID allows the web site to identify the user and retrieve the user's information during subsequent user visits to the web site. Generally, the login ID must be unique to the web site such that no two users have the same login ID. The password associated with the login ID allows the web site to authenticate the user during subsequent visits to the web site. The password also prevents others (who do not know the password) from accessing the web site using the user's login ID. This password protection is particularly important if the web site stores private or confidential information about the user, such as financial information or medical records.

If the user visits several different web sites, each web site may require entry of similar registration information about the user, such as the user's name, mailing address, and e-mail address. This repeated entry of identical data is tedious when visiting multiple web sites in a short period of time. Many web sites require the user to register before accessing any information provided on the site. Thus, the user must first enter the requested registration information before he or she can determine whether the site contains any information of interest.

After registering with multiple web sites, the user must remember the specific login ID and password used with each web site or other Internet service. Without the correct login ID and password, the user must re-enter the registration information. A particular user is likely to have different login IDs and associated passwords on different web sites. For example, a user named Bob Smith may select "smith" as his login ID for a particular site. If the site already has a user with a login ID of "smith" or requires a login ID of at least six characters, then the user must select a different login ID. After registering at numerous web sites, Bob Smith may have a collection of different login IDs, such as: smith, smith1, bsmith, smithb, bobsmith, bob_smith, and smithbob. Further, different passwords may be associated with different login IDs due to differing password requirements of the different web sites (e.g., password length requirements or a requirement that each password include at least one numeric character and/or at least one uppercase character). Thus, Bob Smith must maintain a list of web sites, login IDs, and associated passwords for all sites that he visits regularly.

Although presently available multi-site user authentication systems permit a web user to maintain a single login ID (and associated password) for accessing multiple, affiliated web servers or services, further improvements are desired. For example, transactional communications between two or more web sites are at risk of tampering by a third party. When a user navigates from one web site to another, using a web browser, there is often a need to share state information between the two sites. A variation of this scenario occurs when one site initiates a transaction to be completed securely on another second site. One common way to deal with this variation is by passing query string parameters attached to the uniform resource locator (URL). In this instance, the parameters contain state and transaction elements. Unfortunately, this method is unreliable because the URL can be tampered with very easily and, thus, the state information may be destroyed. This is particularly problematic in the transactional case (i.e., when one wants to ensure that a transaction is not completed on the second site unless it was truly initiated on the first site).

In addition, it is also important to that the transaction not be vulnerable to a replay attack in which the URL is captured and resubmitted to gain improper access to another user's information. In other words, a good transaction completed on the second site should not be playable again unless it is properly initiated on the first site.

Although making a server-to-server call from one site to the other would ensure transactional integrity, it is understood by those skilled in the art that such a solution would be costly and have negative performance implications. For example, server-to-server transactions are not scalable because the server that initiates the state must also complete it and they have undesirable built-in latencies due to the need to maintain the state between the sites.

For these reasons, improved security is desired to minimize the risk of tampering and other attacks on site-to-site communications, including communications in a multi-site user authentication system.

SUMMARY OF THE INVENTION

The invention meets the above needs and overcomes one or more deficiencies in the prior art by providing improved security for site-to-site transactional communications. Advantageously, the invention prevents tampering with the query string parameters and, thus, reduces the risk of improper communication. The invention further ensures transactional integrity between sites and prevents replay attacks on transactions. Moreover, the features of the present invention described herein are less laborious and easier to implement than currently available techniques as well as being economically feasible and commercially practical.

Briefly described, a method embodying aspects of the invention provides secure communication between first and second network servers on a data communication network. The method includes receiving a request from a user of a client computer for a selected service to be provided by the second network server. The second network server receives the request via a browser of the client computer. The method also includes initiating a transaction between the second network server and the first network server in response to the request and defining a data structure associated with the transaction. After generating a digital signature of the data structure, the method sets forth adding the digital signature to the data structure and directing the client computer from the second network server to the first network server with the data structure and the added digital signature.

In another embodiment of the invention, a system of secure communication includes first and second network servers coupled to a data communication network. The second network server receives and responds to a request from a user of a client computer to provide a selected service. The second network server receives the request via a browser of the client computer and initiates a transaction with the first network server in response to the request. The second network server also defines a data structure associated with the transaction, generates a digital signature of the data structure, and then adds the digital signature to the data structure. In this manner, the client computer is directed from the second network server to the first network server with the data structure and the added digital signature.

Another embodiment of the invention is directed to secure registration by an authentication server associated with a multi-site user authentication system. A method of secure registration includes receiving a request via a browser of a client computer for access to a network server and initiating a registration transaction between the network server and the authentication server in response to the request. The method also includes defining a query string associated with the registration transaction and generating a digital signature of the query string. The method further includes adding the digital signature to the query string as a query string parameter and directing the client computer from the network server to the authentication server with the query string and the added digital signature.

In yet another embodiment, a data structure embodying aspects of the invention includes a first data field that contains data representing a query string. In this instance, the query string is associated with a transaction between at least two network servers coupled to a data communication network. The data structure also includes a second data field containing data representing a first query string parameter added to the query string and a third data field containing data representing a second query string parameter added to the query string. The first query string parameter is a digital signature of the query string and the second query string parameter is an index associated with the transaction and unique to the network server initiating the transaction per transaction.

Alternatively, the invention may comprise various other methods and apparatuses.

Other features will be in part apparent and in part pointed out hereinafter.

BRIEF DESCRIPTION OF THE DRAWINGS

FIG. 5 is a block diagram illustrating components of a computer for use in the system of FIG. 1.

Corresponding reference characters indicate corresponding parts throughout the drawings.

DETAILED DESCRIPTION OF THE INVENTION

Figure 1:
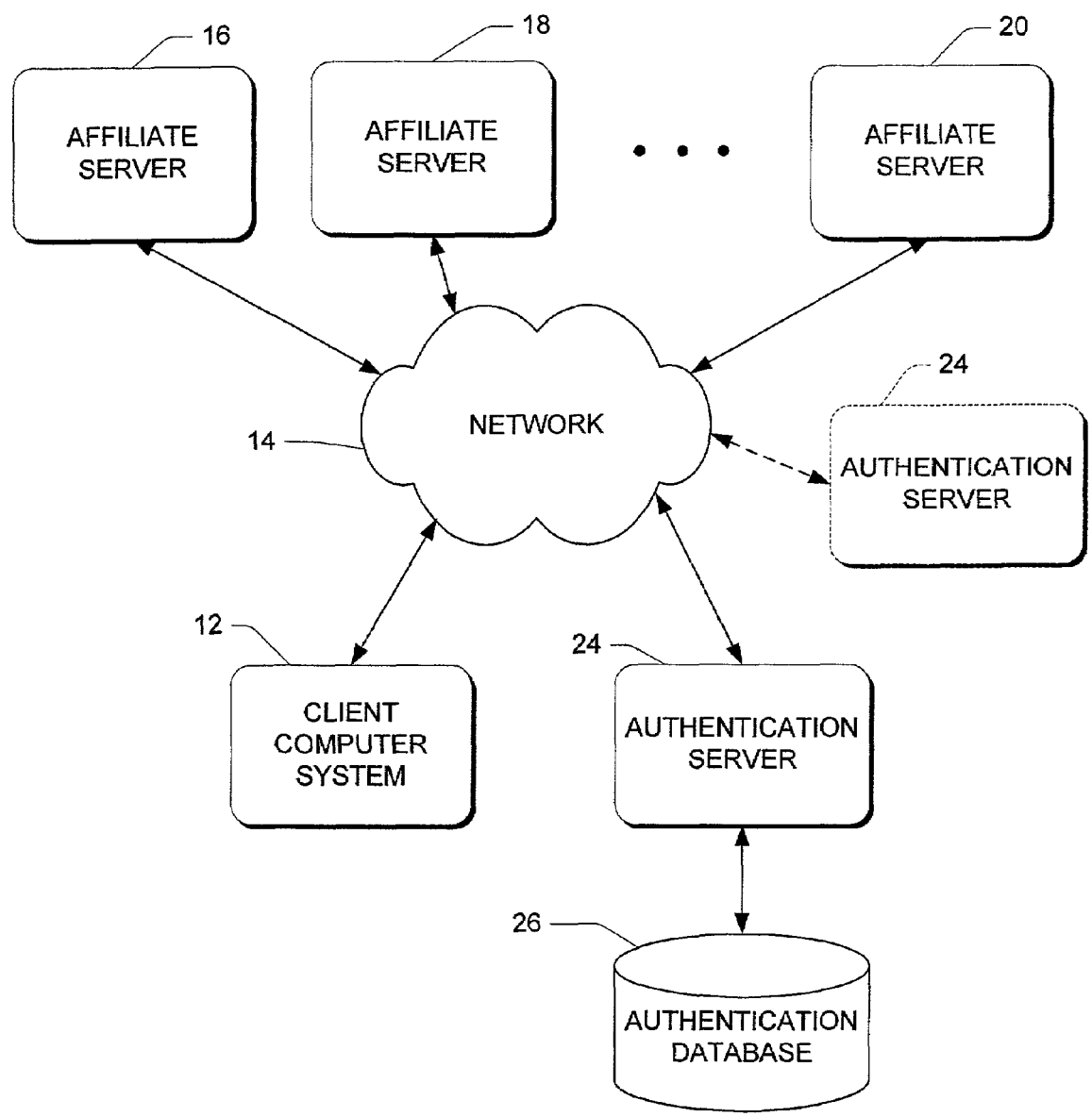
FIG. 1 is a block diagram illustrating an exemplary network environment in which the present invention is utilized.

Referring now to the drawings, FIG. 1 illustrates an exemplary network environment in which the present invention is utilized. A client computer system 12 is coupled to a data communication network 14. In this example, the network 14 is the Internet (or the World Wide Web). However, the teachings of the present invention can be applied to any data communication network. Multiple affiliate servers 16, 18, and 20 are also coupled to network 14. In turn, the client computer system 12 can access the affiliate servers 16, 18, and 20 via network 14. Affiliate servers 16, 18, and 20 are also referred to as "web servers" and "network servers." An authentication server 24 coupled to network 14 allows communication between itself and client computer system 12 and web servers 16, 18, and 20. Although referred to as an "authentication server," authentication server 24 in the illustrated embodiment is also a web server capable of interacting with web browsers and other web servers. In this example, data is communicated between authentication server 24, client computer system 12, and web servers 16, 18, 20 using the hypertext transfer protocol (HTTP), a protocol commonly used on the Internet to exchange information.

An authentication database 26 is coupled to authentication server 24. The authentication database 26 contains information necessary to authenticate a user of client computer system 12 (as well as other users on the network) and also identifies which elements of the user profile information should be provided to a particular affiliate server when the user accesses the affiliate server. Although authentication database 26 is shown separately from authentication server 24, it is to be understood that in other embodiments of the invention, authentication database 26 may be contained within authentication server 24. In a federated environment, for example, a plurality of authentication servers 24 may be used to provide authentication services (see authentication server 24 shown in phantom).

The authentication server 24, as described below, authenticates a user of client computer 12 seeking access to a particular one of the affiliate servers 16, 18, 20. Authentication server 24 first requests authenticating information from the user, such as the user's login ID and password. If the user is successfully authenticated, authentication server 24 routes client computer 12 to the appropriate affiliate server for performing a desired service for the user.

As part of the user authentication process, authentication server 24 may provide certain user profile information to the affiliate server, such as the user's e-mail address, user preferences, and the type of Internet browser installed on client computer 12. This user profile information is associated with the user's login ID so that each time the user logs into a particular affiliate server, the associated user profile information is available to the affiliate server. This user profile allows the user to enter the information once and use that information during subsequent logins to new affiliate servers.

In one embodiment, an "affiliate server" is a web server that has "registered" or otherwise established a relationship or affiliation with authentication server 24. Each affiliate server 16, 18, and 20 includes a code sequence (not shown) that allows the affiliate server to communicate with authentication server 24 when a user (who is also registered with the authentication server) requests access to the affiliate server. Additional details regarding the authentication process and the interaction between client computer 12, affiliate servers 16, 18, 20, and authentication server 24 are provided below.

Prior to executing the authentication process described below, both the user of client computer system 12 and the operator(s) of affiliate servers 16, 18, 20 "register" with authentication server 24. This registration is a one-time process that provides necessary information to the authentication server. The user of client computer system 12 registers with authentication server 24 by providing, for example, the user's name, mailing address, and e-mail address, and/or other information about the user or client computer system 12. As part of the user registration process, the user is assigned (or selects) a login ID, which is a common login ID, used to access any affiliate server (e.g., server 16, 18, 20). The login ID may also be referred to herein as a "username," "member name," or "login name". Additionally, the user selects a password associated with the login ID that is used for authentication purposes. After registering and logging into the authentication server, the user can visit any affiliate server (i.e., affiliate servers that are also registered with the same authentication server) without requiring any additional authentication and without re-entering user information that is already contained in the associated user profile.

The operator(s) of affiliate servers 16, 18, 20 register with authentication server 24 by providing information about the affiliate server (e.g., server name and Internet address). Additionally, each affiliate server 16, 18, 20 provides information regarding its authentication requirements. The requirements for authentication may be specified in terms of a maximum time allowed since the last login and entry of authentication information by the user. These requirements may also be specified by the maximum time allowed since the last "refresh" of the authentication information by the user.

Refreshing the authentication information refers to the process of having the user re-enter the password to be certain that the appropriate user is still operating client computer system 12. This periodic refreshing of authentication information is useful if the user leaves his or her computer system without logging out of authentication server 24, thereby allowing another individual to access affiliate servers 16, 18, and 20 using the login ID of the previous user. If a user requests access to one of the affiliate servers 16, 18, and 20 after the maximum allowed time has lapsed, then authentication server 24 re-authenticates (i.e., refreshes) the user. Thus, although there is a central authentication server 24, affiliate servers 16, 18, 20 can establish their own authentication requirements to be enforced by the authentication server. After registering with authentication server 24, affiliate servers 16, 18, 20 can use the authentication server to authenticate any user that has also registered with the authentication server.

Figure 2:
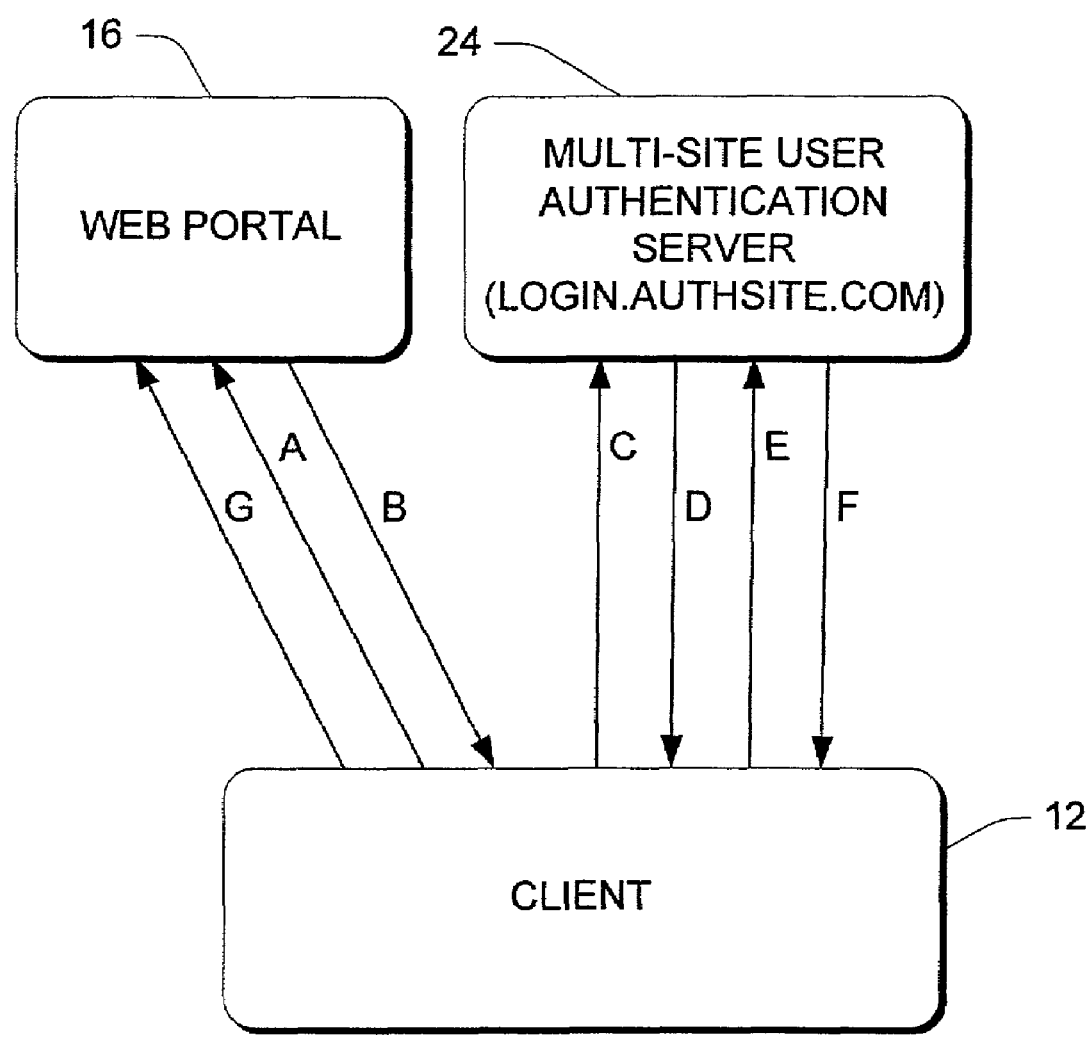
FIGS. 2 and 3 are exemplary flow diagrams illustrating the interaction between a client computer, an affiliate server, and an authentication server of FIG. 1 when a user of the client computer seeks access to the affiliate server.

FIG. 2 is an exemplary flow diagram illustrating an implementation of the present invention and the interaction between client computer system 12, at least one affiliate server 16, and authentication server 24 when a user of the client computer system seeks access to the affiliate server. For simplicity, the following description is directed to affiliate server 16 although the principles apply to affiliate server 18, affiliate server 20, and any other affiliated web service utilizing the multi-site user authentication system of the present invention.

The illustrated example of FIG. 2 describes the situation in which the user of client computer system 12 has not yet logged into affiliate server 16 and has not yet been authenticated by authentication server 24. In one embodiment of the invention, a plurality of authentication servers 24 provides a federated environment. The lines in FIG. 2 labeled "A" through "G" represent the flow of information or activities during the authentication process. The arrows on the lines indicate the direction of the process flow. The label "A" represents the beginning of the processes and the label "G" represents the end of the process.

In the exemplary process flow of FIG. 2, the user of client computer system 12 begins by accessing a portal service (e.g., MSN® network of Internet services at http://www.msn.com) available via affiliate server 16. The user selects one of the services available through the portal. For example, the user accesses an online shopping service, or another web service, available through the portal by clicking on a link (e.g., http://eshop.msn.com). (See A).

The affiliate server 16 first presents the user with a sign-in interface (e.g., "click here to login"). The portal service of affiliate server 16 then redirects client computer system 12 to the multi-site user authentication system provided by authentication server 24 (e.g., Microsoft® Passport sign-in service) when the user clicks on the sign-in interface. (See B). In general, the process of authenticating a user begins when the user signs in to a participating site (and has not already been authenticated). Typically, the user first attempts to sign in or access a page. At the affiliate site, the user clicks the sign-in link to begin the authentication process. The user's request is redirected from the participating site to the sign-in page of authentication server 24. When affiliate server 16 registered to participate in the authentication system, authentication server 24 provided the site with a unique ID and encryption key. The site ID and a return URL, for example, are both added to the authentication server login URL in query string parameters. The return URL is generally the same as the URL in the user's request.

In the example of FIG. 2, affiliate server 16 redirects client computer system 12 to login.authsite.com and client computer system 12 follows the redirect command issued by the portal. The authentication server handles the request by first checking the Site ID and return URL. If they do not match an entry in the list of affiliate sites, authentication is rejected and the sign-in page is not displayed. This part of the process ensures that only valid and registered participating sites can request user authentication. On the other hand, if the site is recognized, authentication server 24 displays a page with a secure form that prompts the user to enter his or her login information (e.g., username and password).

The authentication server 24 determines if there is an authentication cookie under the *.authsite.com domain indicating that the user has already been authenticated. If not, a user interface module at login.authsite.com of the authentication server 24 responds with a user interface page that accepts username/password. (See C). The user enters his or her username/password and posts the information to authentication server 24 at login.authsite.com. (See D). When the user clicks the sign-in link on that page, the login data is transmitted to authentication server 24 using, for example, the secure sockets layer (SSL) protocol. Using the SSL protocol also enhances authentication system's security.

The authentication server 24 then validates the username/password provided by the user. (See E). The authentication server handles the authentication response by comparing the login data to the entries in authentication database 26. If the username and password match an entry in the database 26, the user is authenticated. A unique identifier (e.g., Passport Unique Identifier (PUID)) and a user profile corresponding to the authenticated user are extracted from the database.

The authentication server 24 uses this information to create encrypted cookies. For example, the authentication system uses Triple DES technology with 168-bit keys to accomplish the encryption. Each participating site has a separate encryption key and keys can be rotated to decrease the likelihood of any one site's encryption key being compromised. The cookies may include a Ticket cookie (including the PUID and a time stamp), a Profile cookie (storing the profile information), and a Visited Sites cookie (storing a list of sites where the user has signed in). After authentication server 24 creates the cookies, it uses the encryption key and site ID to encrypt the ticket and profile data. This encrypted data is then added as query string parameters to the return URL provided in the authentication request and authentication server 24 presents this URL to the user's browser. The user's browser then creates the cookies in the authsite.com domain on the user's client computer 12.

The process proceeds with handling the authenticated request plus ticket and profile information. If the validation is successful, authentication server 24 looks up the desired web service location and redirects client computer system 12 to the appropriate service (e.g., http://eshop.msn.com/) with encrypted ticket/profile information. (See F). In other words, authentication server 24 retrieves the appropriate location information from authentication database 26 to identify the location of server 16 (or server 18 or 20) providing the selected service.

The authentication server 24 redirects the user to affiliate server 16 and the encrypted ticket and profile data are passed to the site as query string parameters. The participating site (i.e., affiliate server 16) extracts the ticket and profile data from the query string parameters and sends it to an object running at the participating site for decryption. The object decrypts the information and receives the PUID and the profile information.

The client computer 12 then follows the redirect to the web service at affiliate server 16 (e.g., http://eshop.msn.com) and is authenticated. (See G). At this time, the participating site can use the profile information to create (or upgrade for a returning user) the profile data in its own database. The participating site can also use the encrypted ticket and profile data to write its own cookies (in its own domain name) on the user's machine. These cookies may be used to authenticate the user to affiliate server 16 and allow it to deliver personalized content based on the PUID, profile data, and/or consumer preferences (if he or she is a returning user).

In one embodiment, the information exchanged during the authentication process occurs through the client's browser using HTTP redirects and cookies, although the object at the participating web site may periodically download a centrally-hosted configuration file that contains current URLs for authentication server 24 and the current profile configuration.

If the user-entered information is not correct (i.e., it does not match the information stored in authentication database 26), then authentication server 24 generates and communicates a web page to the user indicating that the login ID and password combination was not valid. In the event of username and/or password failure, security concerns, for example, may limit the number of times the user can attempt to login.

Figure 3:
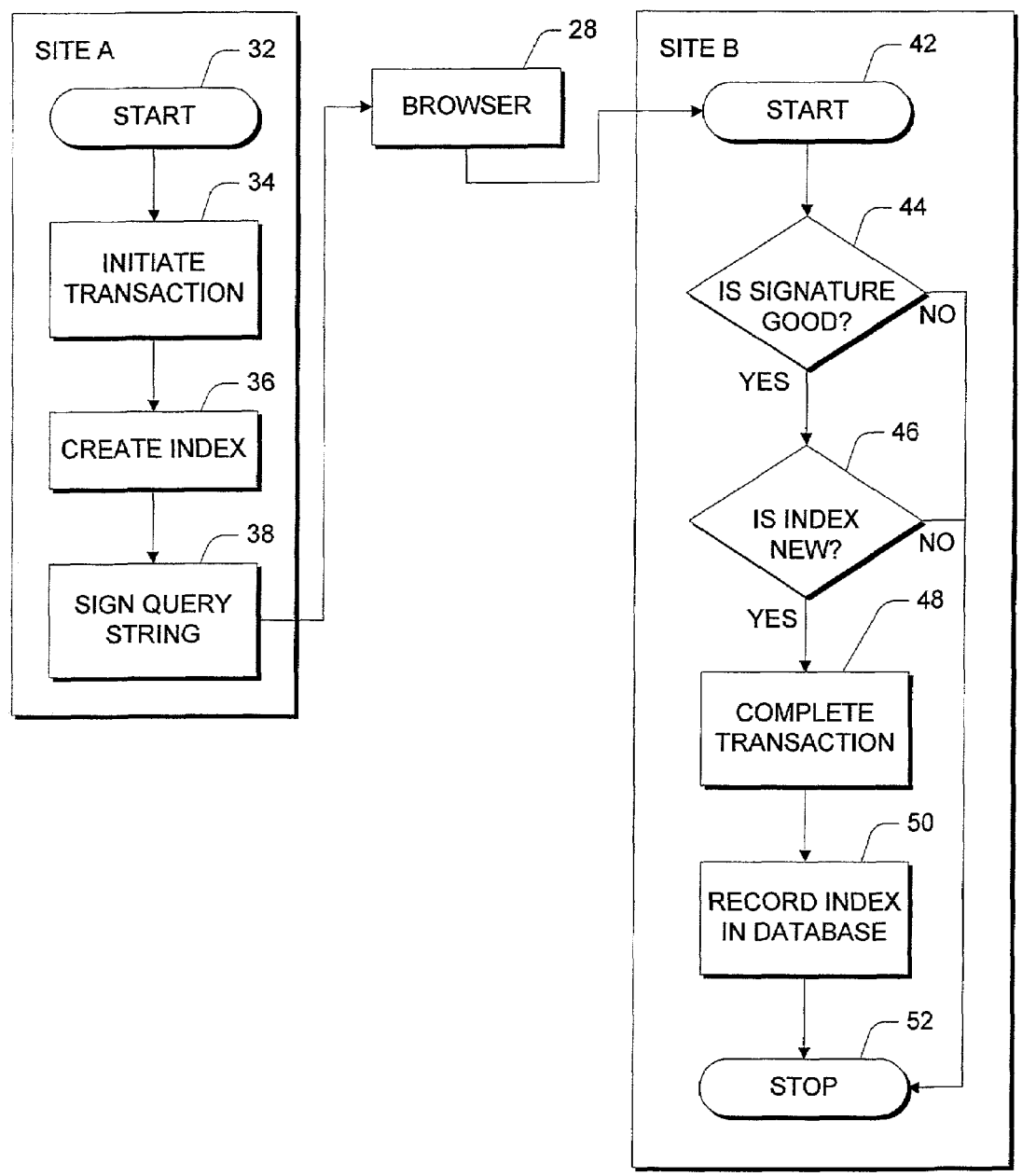

Referring now to the exemplary flow diagram of FIG. 3, the present invention provides improved security for minimizing the risk of tampering and other attacks on site-to-site communications, including registration communications in a multi-site user authentication system such as described herein. It is to be understood that the present invention is useful for securing transactional communications between any network servers on a data communications network.

In general, the invention prevents tampering with the query string parameters and, thus, reduces the risk of improper communication. The invention further ensures transactional integrity between sites and prevents replay attacks on transactions via client pivoting using the HTTP protocol. Advantageously, a transaction is immune from a replay attack at any level in the chain.

In the illustrated embodiment, a browser 28 of client computer 12 sends an HTTP request to a first site (e.g., affiliate server 16), referred to as Site A. Beginning at 32, Site A receives the request from the browser 28 and proceeds to 34 for initiating a transaction between itself and a second site (e.g., authentication server 24), referred to as Site B. For example, Site A desires to ask Site B to complete a user registration. To ensure secure communication, Site B seeks confirmation that Site A actually initiated the transaction and that it has not tampered with or replayed.

When Site A initiates the transaction, it adds two new parameters to the query string. At 32, Site A creates an index that is known to be unique in Site A, per transaction, and is known to be new and unique for Site B. It is to be understood that one of the existing parameters could be used as the index if it meets the uniqueness criteria. This feature can be extended to any number of sites as long as the uniqueness criteria are maintained.

Proceeding to 34, Site A signs the query string. In other words, Site A generates a digital signature of the entire query string. The signature can be created, for example, by using a shared common key. This feature can also be extended to any number of sites as long as all sites have knowledge of the key. In this embodiment, Site A is responsible for generating the index and the signature.

Site A redirects the user to Site B with the index and digital signature. When the user arrives at 42, Site B checks the signature against the query string, at 44, and checks the index against internal records (e.g., previously recorded indices stored in authentication database 26), at 46. In other words, Site B determines if it has ever received this particular index before. Site B does not need to have shared knowledge of the present index. Rather, Site B maintains records of indices that have been used in connection with past transactions. If the added query string parameters check, Site B proceeds to 48 for completing the transaction and then, at 50, records the transaction along with the index in database 26. On the other hand, if either the signature does not match the query string or the index is already present in Site B's records, the transaction is aborted at 52 because of tampering.

The following is an example of a query string, including query string parameters, in accordance with the present invention:

https://register.authsite.com/reg.srf?ct=11017786342&stynm=wez&tw=70000&ru=&ns=custsite.com&lc=1033&kv=1&id-4261&cb=&pppg=1&ppgo=2&ppval=1&pperr=0&ver=2.0.0248.1&tpf=4b52a52bc6a2df169b7e60b92b72b467

In this embodiment, the last parameter of the query string is tpf=4b52a52bc6a2df169b7e60b92b72b467, which is the parameter used to sign the query string. This specific query string does not include an index because the transaction is over SSL, which prevents replays. In the alternative, the query string has an extra query string parameter, i.e., the index, in the format of Mn=iulianc@custsite.com.

Advantageously, the invention provides the ability to accept web registrations in managed name spaces, via flexible registration; the ability to securely embed the username in the registration request; and the ability to accept web registrations only from trusted sources. Appendix A provides an implementation overview of the invention. In general, the registration server must be able to accept registrations from trusted parties only. For example, absent the invention, anyone can manually type/generate a URL and end up with a new login in any non-managed name space. The purpose of this feature of the present invention is to ensure that only known, registered namespace owners can initiate the registration of a new login, in a given managed name space. Also, an affiliate that uses the secure registration feature of the invention must be able to enforce the member name, or username, when a new login is created. It is assumed that the registering party has a way to enforce member name uniqueness. Currently the registration server blocks Web registrations in managed name spaces. Secure registrations are allowed in managed name spaces.

Figure 4:
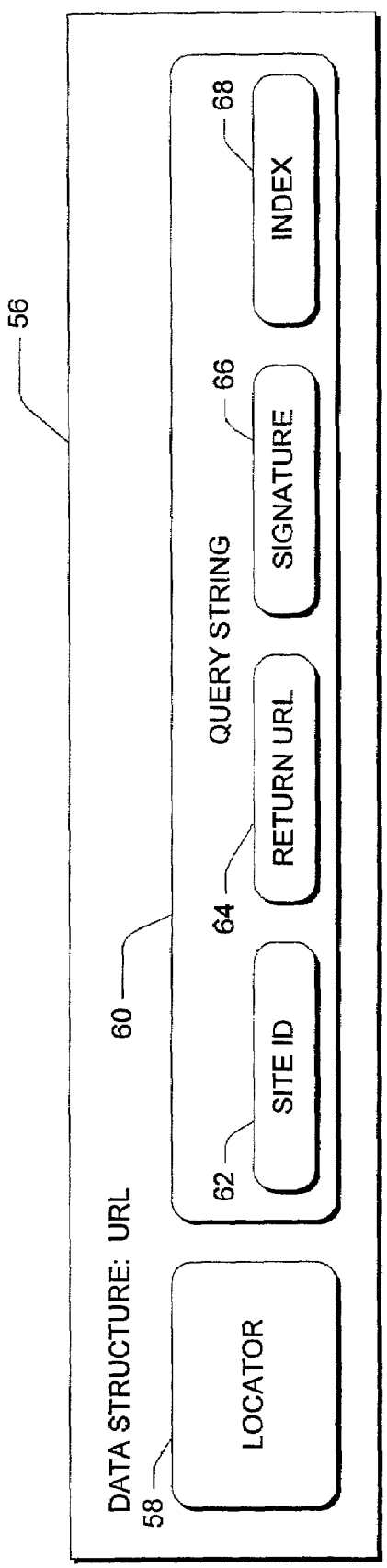
FIG. 4 is a block diagram illustrating an exemplary data structure embodying aspects of the invention.

Referring now to FIG. 4, a data structure 56 embodying aspects of the invention, such as a URL or other resource identifier, includes a data field 58 representative of locator or address information of a resource on a data communication network. A data field 60 contains data representing a query string. In this embodiment, the query string is associated with a transaction between at least two network servers coupled to the network. The query string data field 60 includes a site ID 62 and a return URL 64 as described above. According to the invention, query string data field 60 also includes a data field 66 and a data field 68, both containing data representing a query string parameters added to the query string. The query string parameter of data field 66 is a digital signature of query string data field 60 (e.g., site ID 62 and return URL 64). The query string parameter of data field 68 represents an index associated with the transaction and unique, per transaction, to the network server initiating the transaction.

FIG. 5 shows one example of a general purpose computing device in the form of a computer 70. In one embodiment of the invention, a computer such as the computer 70 is suitable for use in client computer system 12, authentication server 24, user interface server 28, or any of affiliate servers 16, 18, and 20.

In the illustrated embodiment, computer 70 has one or more processors or processing units 72 and a system memory 74. In the illustrated embodiment, a system bus 76 couples various system components including the system memory 74 to the processors 72. The bus 76 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 70 typically has at least some form of computer readable media. Computer readable media, which include both volatile and nonvolatile media, removable and non-removable media, may be any available medium that can be accessed by computer 70. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can accessed by computer 70. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of the any of the above are also included within the scope of computer readable media.

The system memory 74 includes computer storage media in the form of removable and/or non-removable, volatile and/or nonvolatile memory. In the illustrated embodiment, system memory 74 includes read only memory (ROM) 78 and random access memory (RAM) 80. A basic input/output system 82 (BIOS), containing the basic routines that help to transfer information between elements within computer 70, such as during startup, is typically stored in ROM 78. The RAM 80 typically contains data and/or program modules that are immediately accessible to and/or presently being operated on by processing unit 72. By way of example, and not limitation, FIG. 5 illustrates operating system 84, application programs 86, other program modules 88, and program data 90.

The computer 70 may also include other removable/non-removable, volatile/nonvolatile computer storage media. For example, FIG. 5 illustrates a hard disk drive 94 that reads from or writes to non-removable, nonvolatile magnetic media. FIG. 5 also shows a magnetic disk drive 96 that reads from or writes to a removable, nonvolatile magnetic disk 98, and an optical disk drive 100 that reads from or writes to a removable, nonvolatile optical disk 102 such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 94, and magnetic disk drive 96 and optical disk drive 100 are typically connected to the system bus 76 by a non-volatile memory interface, such as interface 106.

The drives or other mass storage devices and their associated computer storage media discussed above and illustrated in FIG. 5, provide storage of computer readable instructions, data structures, program modules and other data for the computer 70. In FIG. 5, for example, hard disk drive 94 is illustrated as storing operating system 110, application programs 112, other program modules 114, and program data 116. Note that these components can either be the same as or different from operating system 84, application programs 86, other program modules 88, and program data 90. Operating system 110, application programs 112, other program modules 114, and program data 116 are given different numbers here to illustrate that, at a minimum, they are different copies.

A user may enter commands and information into computer 70 through input devices such as a keyboard 120 and a pointing device 122 (e.g., a mouse, trackball, pen, or touch pad). Other input devices (not shown) may include a microphone, joystick, game pad, satellite dish, scanner, or the like. These and other input devices are connected to processing unit 72 through a user input interface 124 that is coupled to system bus 76, but may be connected by other interface and bus structures, such as a parallel port, game port, or a universal serial bus (USB). A monitor 128 or other type of display device is also connected to system bus 76 via an interface, such as a video interface 130. In addition to the monitor 128, computers often include other peripheral output devices (not shown) such as a printer and speakers, which may be connected through an output peripheral interface (not shown).

The computer 70 may operate in a networked environment using logical connections to one or more remote computers, such as a remote computer 134. The remote computer 134 may be a personal computer, a server, a router, a network PC, a peer device or other common network node, and typically includes many or all of the elements described above relative to computer 70. The logical connections depicted in FIG. 5 include a local area network (LAN) 136 and a wide area network (WAN) 138, but may also include other networks. Such networking environments are commonplace in offices, enterprise-wide computer networks, intranets, and global computer networks (e.g., the Internet).

When used in a local area networking environment, computer 70 is connected to the LAN 136 through a network interface or adapter 140. When used in a wide area networking environment, computer 70 typically includes a modem 142 or other means for establishing communications over the WAN 138, such as the Internet. The modem 142, which may be internal or external, is connected to system bus 76 via the user input interface 124, or other appropriate mechanism. In a networked environment, program modules depicted relative to computer 70, or portions thereof, may be stored in a remote memory storage device (not shown). By way of example, and not limitation. FIG. 5 illustrates remote application programs 144 as residing on the memory device. It will be appreciated that the network connections shown are exemplary and other means of establishing a communications link between the computers may be used.

Generally, the data processors of computer 70 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described below.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 70, the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, executed by one or more computers or other devices. Generally, program modules include, but are not limited to, routines, programs, objects, components, and data structures that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

The present invention essentially allows for easy and tamper-proof transactional communication between two or more Internet sites via client pivoting using the HTTP protocol. Advantageously, a transaction is immune from a replay attack at any level in the chain.

When introducing elements of the present invention or the embodiments thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above constructions and methods without departing from the scope of the invention, it is intended that all matter contained in the above description and shown in the accompanying drawings shall be interpreted as illustrative and not in a limiting sense.

APPENDIX A 1.1 Secure Registrations

Name spaces for which secure registration is enabled, have a property called <SecureRegistration>1</SecureRegistration> in the Site.xml file. By default there is no such property for any Name Space.

A name space for which Secure Registration is enabled only accepts secure registrations.

If an Affiliate registers in a name space that has Secure Registration enabled, then the Affiliate also becomes Secure Registration enabled by default, even though the site.xml for that Affiliate may not have the <SecureRegistration> property set.

Users are only able to register at a secure registration Affiliate site using a link built by the Affiliate site. The sign-up link at the login server, for such sites points towards EASI registrations.

The Affiliate site has to build the tpf query string parameter in a similar manner with the way the tpf query string parameter is built using the AuthURL method in, for example, Passport Manager.

tpf—is an Affiliate key hash of the ascii representation of the query string parameters used in the registration URL. Tpf is appended to the end of the query string. If there are parameters appended after the tpf, they are not considered signed and included in the hash.

1.1.1 Functionality—Affiliate Side

To make this work, the name space owner (NSO) has to work with the Site Provisioning team to set the appropriate values for <SecureRegistration> and <NamespaceOwner> in Nexus.

The Affiliate site provides the registration link that includes the tpf query string parameter. Ideally a Passport Manager method (RegistrationURL) is provided to automatically build tpf.

1.1.2 Functionality—Registration Server Side

The registration server has to verify the requesting site id registration. If that site is marked as <SecureRegistration> then the consistency of the tpf parameter is checked. If that fails the server displays the "invalid site id" registration page.

If <SecureRegistration> is NOT set then the server has to check the <NamespaceOwner>, lookup the site-id for that namespace and then go to that site.xml to verify that the <SecureRegistration> is set. If <SecureRegistration> is set then it would validate the tpf parameter. If any of these checks fail it displays the 'invalid site id' error page.

The check of the tpf parameter is also checked in all subsequent registration error pages.

1.2 Member Name Enforcement

This feature functions only in conjunction with the secure registration feature. As long as the prefill member name (the mn query string parameter) is passed in the query string before tpf is built, everything will work fine.

It is the Affiliate's responsibility to ensure uniqueness of the member name, so that registration is successful.

If the registration server encounters an existing member name, then the consumer is redirected to the initiating Affiliate, with an appropriate error code.

1.3 Managed Name Spaces, Web Registrations

Currently the registration server blocks registrations in domains that are managed. The registration server changes its behavior and allows registrations in such domains, but only if they are secured registrations.

What is claimed is:

1. A method of secure communication between first and second network servers on a data communication network, said method comprising:
   receiving a request from a user of a client computer for a selected service to be provided by the second network server, said request being received at the second network server via a browser of the client computer, said client computer and said second network server being coupled to the data communication network;
   initiating a transaction between the second network server and the first network server in response to the request, said first network server also being coupled to the data communication network;
   said second network server:
      defining a data structure associated with the transaction;
      generating a digital signature of the data structure;
      adding the digital signature to the data structure;
      generating an index associated with the transaction, wherein the index corresponds to a value generated as a function of data associated with the transaction, the first network server, and the second network server, said value being unique to the transaction and to the first network server and to the second network server;
      adding the index to the data structure; and
      directing the client computer from the second network server to the first network server with the data structure and the added digital signature, wherein the first network server stores one or more indices from previous transactions in a memory area, and wherein the first network server compares the index in the data structure received from the client computer against the stored indices to prevent a replay attack.

2. The method of claim 1 wherein the data structure includes a unique identifier and return location associated with the second network server.

3. The method of claim 1 wherein the data structure comprises a query string contained in a uniform resource locator (URL) and wherein the digital signature is added to the query string as a query string parameter.

4. The method of claim 1 wherein the second network server adds the digital signature to the data structure before directing the client computer to the first network server.

5. The method of claim 1 wherein generating the digital signature comprises encrypting the data structure, by the second network server, using a shared key.

6. The method of claim 1 further comprising decrypting the encrypted data structure, by the first network server, and comparing the signature to the decrypted data structure to determine if the signature is valid.

7. The method of claim 6 further comprising aborting the transaction if the signature is not valid.

8. The method of claim 1 wherein the data structure comprises a query string contained in a URL and wherein the index is added to the query string as a query string parameter.

9. The method of claim 1 further comprising recording the transaction and the index in the memory area if the index does not match any of the stored indices in the memory area.

10. The method of claim 1 further comprising aborting the transaction if the index is already present in the memory area.

11. The method of claim 1 wherein the first network server is an authentication server associated with a multi-site user authentication system and wherein the index is representative of login information retrieved from the user for authenticating the user.

12. The method of claim 11 wherein the retrieved login information includes a login ID and a password associated with the login ID.

13. The method of claim 1 wherein the second network server initiates the transaction in response to the request from the user of the client computer.

14. The method of claim 1 wherein the client computer is directed between the first and second network servers according to a hypertext transfer protocol.

15. The method of claim 1 wherein one or more computer storage media have computer-executable instructions for performing the method of claim 1.

16. A system of secure communication between first and second network servers coupled to a data communication network, said system comprising the second network server, said second network server receiving and responsive to a request from a user of a client computer to provide a selected service, said second network server receiving the request via a browser of the client computer, said second network server initiating a transaction with said first network server in response to the request and defining a data structure associated with the transaction, said second network server further generating a digital signature of the data structure and generating an index associated with the transaction, wherein the index corresponds to a value generated as a function of data associated with the transaction the first network server and the second network server, said value being unique to the transaction and to the first network server and to the second network server, said second network server further adding the digital signature and the index to the data structure whereby the client computer is directed from the second network server to the first network server with the data structure and the added digital signature, wherein the first network server stores one or more indices from previous transactions in a memory area for comparison with the index from the data structure received from the client computer to prevent a replay attack.

17. The system of claim 16 wherein the data structure includes a unique identifier and return location associated with the second network server.

18. The system of claim 16 wherein the data structure is a query string contained in a uniform resource locator (URL) and wherein the digital signature is added to the query string as a query string parameter.

19. The system of claim 16 wherein the first and second network servers share an encryption key and wherein the second network server generates the digital signature by encrypting the data structure using the shared key.

20. The system of claim 16 wherein the first network server determines if the signature is valid by decrypting the data structure and comparing the signature to the decrypted data structure.

21. The system of claim 20 wherein the first network server aborts the transaction if the signature is not valid.

22. The system of claim 16 wherein the first network server compares the index to the stored indices and records the transaction and the index if the index does not match any of the stored indices in the memory area and aborts the transaction if the index is already present in the memory area.

23. The system of claim 16 wherein the first network server is an authentication server associated with a multi-site user authentication system and wherein the index is representative of login information retrieved from the user for authenticating the user.

24. The system of claim 23 wherein the retrieved login information includes a login ID and a password associated with the login ID.

25. The system of claim 16 wherein the client computer is directed between the first and second network servers according to a hypertext transfer protocol.

26. A method of secure registration by an authentication server associated with a multi-site user authentication system, said method comprising:

receiving a request from a user of a client computer for access to a network server, said request being received at the network server via a browser of the client computer, said client computer, network server, and authentication server being coupled to a data communication network;

said network server:

initiating a registration transaction between the network server and the authentication server in response to the request for registering the user of the client computer for access to the network server;

defining a query string associated with the registration transaction;

generating a digital signature of the query string;

adding the digital signature to the query string as a query string parameter;

generating an index associated with the transaction, wherein the index corresponds to a value generated as a function of data associated with the transaction, the first network server, and the second network server, said value being unique to the transaction and to the authentication server and to the network server;

adding the index to the data structure; and directing the client computer from the network server to the authentication server with the query string and the added digital signature, wherein the authentication server stores one or more indices from previous registration transactions in a memory area, and wherein the authentication server compares the index from the data structure received from the client computer against the stored indices to prevent a replay attack.

27. The method of claim 26 wherein the query string includes a unique identifier and a return uniform resource locator (URL) associated with the network server.

28. The method of claim 26 wherein generating the digital signature comprises encrypting the data structure, by the network server, using an encryption key shared with the authentication server.

29. The method of claim 26 further comprising decrypting the encrypted data structure, by the authentication server, and comparing the signature to the decrypted data structure to determine if the signature is valid.

30. The method of claim 26 further comprising recording the registration transaction and the index in the memory area if the index does not match any of the stored indices in the memory area.

31. The method of claim 26 further comprising aborting the registration transaction if the index is already present in the memory area or the signature is not valid or both.

32. The method of claim 26 wherein the index is representative of login information retrieved from the user for authenticating the user.

33. The method of claim 32 wherein the retrieved login information includes a login ID and a password associated with the login ID.

34. The method of claim 26 wherein the client computer is directed between the network server and the authentication server according to a hypertext transfer protocol.

35. The method of claim 26 wherein one or more computer storage media have computer-executable instructions for performing the method of claim 26.

36. One or more computer storage media having stored thereon a data structure comprising:

a first data field containing data representing a query string, said query string being associated with a transaction between at least two network servers and a client computer coupled to a data communication network;

a second data field containing data representing a first query string parameter added to the query string, said first query string parameter comprising a digital signature of the query string; and a third data field containing data representing a second query string parameter added to the query string, said second query string parameter comprising an index associated with the transaction, wherein the index corresponds to a value generated as a function of data associated with both of the network servers and with the transaction, wherein the value is unique to both of the network servers and to the transaction, wherein one of the network servers directs a client computer from said one of the network servers to the other network server with the data structure, wherein said other network server stores one or more indices from previous transactions in a memory area, and wherein said other network server compares the index from the third field in the data structure against the stored indices to prevent a replay attack.

37. The computer storage media of claim 36 wherein the data structure comprises a uniform resource locator (URL).

38. The computer storage media of claim 37 wherein the query string includes data representing a unique identifier and return URL associated with the network server initiating the transaction.

39. The computer storage media of claim 36 wherein digital signature comprises the query string encrypted by an encryption key shared by the network servers.

40. The computer storage media of claim 36 wherein one of the network servers is an authentication server associated with a multi-site user authentication system and wherein the index includes data representative of login information retrieved from the user for authenticating the user.

41. The computer storage media of claim 40 wherein the retrieved login information includes a login ID and a password associated with the login ID.

* * * * *

UNITED STATES PATENT AND TRADEMARK OFFICE
CERTIFICATE OF CORRECTION

PATENT NO. : 7,356,711 B1
APPLICATION NO. : 10/158376
DATED : April 8, 2008
INVENTOR(S) : Iulian D. Calinov et al.

Page 1 of 1

It is certified that error appears in the above-identified patent and that said Letters Patent is hereby corrected as shown below:

In column 11, line 40, after "limitation" delete "." and insert -- , --, therefor.

In column 15, line 14, in Claim 16, after "transaction" insert -- , --.

In column 15, line 15, in Claim 16, after "server" insert -- , --.

Signed and Sealed this
Twenty-second Day of February, 2011

David J. Kappos
*Director of the United States Patent and Trademark Office*